US009830174B2

(12) United States Patent
Van Damme et al.

(10) Patent No.: US 9,830,174 B2
(45) Date of Patent: Nov. 28, 2017

(54) DYNAMIC HOST CODE GENERATION FROM ARCHITECTURE DESCRIPTION FOR FAST SIMULATION

(75) Inventors: Jacques Van Damme, Heverlee (BE); Achim Nohl, Aachen (DE); Olaf Luthje, Aachen (DE)

(73) Assignee: Synopsys, Inc., Mountain View, CA (US)

( * ) Notice: Subject to any disclaimer, the term of this patent is extended or adjusted under 35 U.S.C. 154(b) by 993 days.

(21) Appl. No.: 11/584,402

(22) Filed: Oct. 19, 2006

(65) Prior Publication Data

US 2007/0150873 A1 Jun. 28, 2007

Related U.S. Application Data

(60) Provisional application No. 60/753,934, filed on Dec. 22, 2005.

(51) Int. Cl.
*G06F 9/455* (2006.01)
(52) U.S. Cl.
CPC .................. *G06F 9/45504* (2013.01)
(58) Field of Classification Search
CPC ........................ G06F 9/4552; G06F 9/45504
USPC .......................................................... 703/26
See application file for complete search history.

(56) References Cited

U.S. PATENT DOCUMENTS

| | | | | |
|---|---|---|---|---|
| 5,668,969 A * | 9/1997 | Fitch | ........................... | 711/202 |
| 5,940,622 A * | 8/1999 | Patel | ........................... | 717/158 |
| 5,995,754 A * | 11/1999 | Holzle | ........................... | G06F 9/4552 |
| | | | | 717/158 |
| 6,463,582 B1 * | 10/2002 | Lethin et al. | ........................... | 717/158 |
| 6,470,492 B2 * | 10/2002 | Bala et al. | ........................... | 717/128 |
| 6,704,925 B1 * | 3/2004 | Bugnion | ........................... | 717/138 |
| 6,725,335 B2 * | 4/2004 | Bala et al. | ........................... | 711/125 |
| 6,751,583 B1 * | 6/2004 | Clarke et al. | ........................... | 703/17 |
| 6,813,705 B2 * | 11/2004 | Duesterwald et al. | ........................... | 712/216 |
| 7,058,929 B2 * | 6/2006 | Charnell et al. | ........................... | 717/135 |
| 7,062,724 B2 * | 6/2006 | Nakajima | ........................... | 716/103 |
| 7,080,366 B2 * | 7/2006 | Kramskoy et al. | ........................... | 717/148 |
| 7,313,773 B1 * | 12/2007 | Braun | ........................... | G06F 17/5022 |
| | | | | 716/103 |
| 2002/0066081 A1 * | 5/2002 | Duesterwald et al. | ........................... | 717/128 |
| 2004/0205712 A1 * | 10/2004 | Holzle | ........................... | G06F 9/4552 |
| | | | | 717/118 |

(Continued)

FOREIGN PATENT DOCUMENTS

EP         1349063         11/2003

OTHER PUBLICATIONS

Ron White, How Computers Work (8th Edition) (How It Works), Release Nov. 19, 2005, Edition 8th, ISBN 0789734249, pp. 87, 94.*

(Continued)

*Primary Examiner* — Juan Ochoa
(74) *Attorney, Agent, or Firm* — Fenwick & West LLP (57) ABSTRACT

Systems and methods of dynamic host code generation from architecture description for fast simulation. In accordance with a method embodiment of the present invention, a method of simulating execution of a first plurality of processor instructions written in a first instruction set comprises generating a second plurality of processor instructions in a second instruction set for emulating the first plurality of processor instructions. The generating is based upon the high level description of the instruction set and/or simulated state information during the simulating.

20 Claims, 9 Drawing Sheets

(56) References Cited

U.S. PATENT DOCUMENTS

2004/0205733 A1    10/2004    Souloglou et al.
2005/0015754 A1    1/2005    Werner et al.

OTHER PUBLICATIONS

IBM Dictionary of Computing, Aug. 1993, Tenth Edition, pp. 234,626.*

Andrew S. Tanenbaum; Structured Computer Organization, 2nd ed.; 1984; ISBN 0138544239; pp. 10-12.*

Thomas Ball, et al.; "Efficient Path Profiling"; Dec. 1996, Proceedings of the 29th Symposium on Micro Architecture (MICRO-29); pp. 1-12.*

Bodik et al., Interprocedural Conditional Branch Elimination, May 1997, ACM SIGPLAN Notices, vol. 32, Issue 5, pp. 146-158.*

Cmelik et al., Shade: A Fast Instruction-Set Simulator for Execution Profiling, 1993, Technical Report UWCSE 93-06-06, pp. i, ii, 1-41.*

Ebcioglu and Altman, DAISY: Dynamic Compilation for 100% Architectural Compatibility, Aug. 5, 1996, IBM Research Report, Computer Science, pp. 0-82.*

Hartoog et al., Generation of Software Tools From Processor Descriptions for Hardware/Software Codesign, Jun. 1997, DAC Proc., pp. 1-4.*

Kobayashi et al., Design Space Exploration for DSP Applications Using the ASIP Development System PEAS-III, 2002, Dept. of Informatics and Mathematical Science, Graduate School of Engineering Science, Osaka University, pp. 3168-3171.*

Viana et al., Exploring Memory Hierarchy with ARCHC, 2003, 15th Symposium on Computer Architecture and High Performance Computing (SBAC), pp. 1-8.*

Braun et al., A Universal Technique for Fast and Flexible Instruction-Set Architecture Simulation, Jun. 2002, DAC Proc., pp. 1625-1639.*

Hoffmann et al., A Novel Methodology for the Design of Application-Specific Instruction-Set Processors (ASIPs) Using a Machine Description Language, Nov. 2001, IEEE Transactions on Computer-Aided Design, pp. 1338-1354.*

Schliebusch et al., "Optimization Techniques for ADL-driven RTL Processor Synthesis", Jun. 8-10, 2005, 16th IEEE International Workshop on Rapid System Prototyping, pp. 165-171.*

Pees et al., "LISA—machine description language for cycle-accurate models of programmable DSP architectures", 1999, Proceedings of the 36th annual ACM/IEEE Design Automation Conference ACM, pp. 933-938.*

Mishra et al., "Functional abstraction driven design space exploration of heterogeneous programmable architectures", 2001, Proceedings of the 14th international symposium on Systems synthesis ACM, pp. 256-261.*

Jung Gyu Park et al., "Specializing the Java object sterilization using partial evaluation for a faster RMI", Parallel and Distributed Systems, 2001, pp. 451-458, XP010551722.

PCT International Search Report, PCT Application No. PCT/US2006/048068, Jul. 23, 2007, 4 pages.

PCT Written Opinion, PCT Application No. PCT/US2006/048068, Jul. 23, 2007, 5 pages.

PCT International Preliminary Report on Patentability, PCT Application No. PCT/US2006/048068, Jun. 24, 2008, 6 pages.

* cited by examiner

```
ALIAS OPERATION ADDi
{
   DECLARE
   {
      GROUP cond = ( condition );
      GROUP Rn = {reg};
      GROUP Rd = {reg};                         110
      GROUP rotImm = {rotImm};
      GROUP imm = {immed8};
   }

SYNTAX
   {
      "ADD" ~cond Rd ~"," Rn ~"," imm rotImm    ──── 120
   }

CODING
   {
      cond 0b00101000 Rn Rd rotImm imm          ──── 130
   }

BEHAVIOR
   {
50~if (cond != 0xE)
   {
160~if (!conditionPassed (cond)) return;
   }
      unsigned int result = getR (Rn);          140 result = result + immRotImm (imm, rotImm);
      setResult (Rd, result);
   }
}
```

```
void ARM926EJS_model::lt_simfct_ADDi(ARM926EJS_insntabl_T *itab)
{
 {
  if (itab->ADDi.cond != 0xE       130
  {
    if (!(CCTable[(itab->ADDi.cond << 4 | CPSR >> 28]))
   return;
  }
  unsigned int result =((itab->ADDi.Rn < 8 || itab->ADDi.Rn== 15)?
   R[itab->ADDi.Rn] : *R_mode[itab->ADDi.Rn]) ;

result = result +
     ((itab->ADDi.imm << (32 - itab-ADDi.rotImm)) |
      (itab->Addi.imm >> itab->ADDi.rotImm)) ;
  {
    if (itab->ADDi.Rd < 8)
   R[itab->ADDi.Rd] = result;
    else
   *RW_mode[itab->ADDi.Rd] = result;
  }
 }
}
```

```
void ARM926EJS_model::lt_warpgen_ADDi(ARM926EJS_insntabl_T *itab)
{
 {
   Jit::Label lab0 = m_current_function->getForwardLabel();
   if(itab->ADDi.cond != 14)
   {
     {
     Jit::Label lab1 = m_current_function->getForwardLabel();
     Jit::Iregister reg0 = m_current_function->getIRegister();
     m_current_function->ldw(reg0, ((unsigned) &(CPSR)));
     Jit::Iregister reg1 = m_current_function->getIRegister();
     m_current_function->lsr(reg1, reg0, ((int) 28));
     m_current_function->freeRegister(reg0);
     Jit::Iregister reg2 = m_current_function->getIRegister();
     m_current_function->lor(reg2, ((int) (itab->ADDi.cond << 4)),
       reg1);
     m_current_function->freeRegister(reg1);
     Jit::Iregister reg3 = m_current_function->getIRegister();
     m_current_function->mul(reg3, reg2, ((unsigned) 1));
     m_current_function->freeRegister (reg2);
     Jit::Iregister reg4 = m_current_function->getIRegister();
     m_current_function->ldb(reg4, reg3, ((unsigned) CCTable));
     m_current_function->freeRegister(reg3);
     m_current_function->jne(lab1, reg4, ((unsigned) 0));

m_current_function->freeRegister(reg4);
     m_current_function->jmp(lab0);                         } 310
     m_current_function->setLabel(lab1);
     }
   }
   Jit::Variable var0 = m_current_function->getVariable(4);
   Jit::Iregister reg5 = m_current_function->getIRegister();
   if(itab->ADDi.Rn < 8 || itab-ADDi.Rn ==15)
   {
     Jit::Iregister reg6 = m_current_function->getIRegister();
     m_current_function->ldw(reg6, ((unsigned) &(R[itab->Addi.Rn])));
     m_current_function->equate(reg5, reg6);
     m_current_function->freeRegister(reg6);
   }
   else
   {
     Jit::IRegister reg7 = m_current_function->getIRegister();
     m_current_function->ldw(reg7, ((unsigned) & (R_mode)));
     Jit::Iregister reg8 = m_current_function->getIRegister();
     m_current_function->ldw(reg8, reg7, ((int) (itab->ADDi.Rn) *
          (4)));
```

FIG. 3

```
    m_current_function->freeRegister(reg7);
    Jit::Iregister reg9 = m_current_function->getIRegister();
    m_current_function->ldw(reg9, reg8);
    m_current_function->freeRegister(reg8);
    m_current_function->equate(reg5, reg9);
    m_current_function->freeRegister(reg9);
  }
  m_current_function->stw(var0, reg5);
  m_current_function->freeRegister(reg5);
  Jit::IRegister reg10 = m_current_function->getIRegister();
  m_current_function->ldw(reg10, var0);
  Jit::Iregister reg11 = m_current_function->getIRegister();
  m_current_function->add(reg11, reg10, ((int) (itab->ADDi.imm << 32
-itab->ADDi.rotImm | itab->ADDi.imm >> itab->ADDi.rotImm)));
  m_current_function->freeRegister(reg10);
  m_current_function->stw(var0, reg11);
  m_current_function->freeRegister(reg11);
  {
    if(itab->ADDi.Rd < 8)
    {
  Jit::Iregister reg12 = m_current_function->getIRegister();
  m_current_function->ldw(reg12, var0);
  m_current_function->stw(((unsigned) &(R[itab->ADDi.Rd])), reg12);
  m_current_function->freeRegister(reg12);
    }
    else
    {
  Jit::Iregister reg13 = m_current_function->getIRegister();
  m_current_function->ldw(reg13, ((unsigned) &(RW_mode)));
  Jit::Iregister reg14 = m_current_function->getIRegister();
  m_current_function->ldw(reg14, reg13, ((int) (itab->ADDi.Rd) *
(4)));
  m_current_function->freeRegister(reg13);
  Jit::Iregister reg15 = m_current_function->getIRegister();
  m_current_function->ldw(reg15, var0);
  m_current_function->stw(reg14, reg15);
  m_current_function->freeRegister(reg14);
  m_current_function->freeRegister(reg15);
    }
  }
  m_current_function->setLabel(lab0);
  m_current_function->freeVariable(var0);
  }
}
```

```
/*
 * The following is the code generated for a first case in which:
 * cond = 0xE
 * rotImm = 0
 * imm = 8
 * Rn = 1
 * Rd = 2
 */
    ldw(reg6, ((unsigned) &(R[1])));
    stw(var0, reg5);
    ldw(reg10, var0);
    add(reg11, reg10, 8);
    stw(var0, reg11);
    ldw(reg12, var0);
    stw(((unsigned) &(R[2])), reg12);
    end
```

```
/*
 * The following is the code for another case in which:
 * cond = 0
 * rotImm = 0
 * imm = 8
 * Rn = 9
 * Rd = 10
 */
    ldw(reg0, ((unsigned) &(CPSR)));
    lsr(reg1, reg0, ((int) 28));
    lor(reg2, ((int) (itab->ADDi.cond << 4)), reg1);
    ldb(reg4, reg3, ((unsigned) CCTable));
    jne(lab1, reg4, L1);
L1:
    jmp(L2);
    ldw(reg7, ((unsigned) &(R_mode)));
    ldw(reg8, reg7, ((int) (9) * (4)));
    ldw(reg9, reg8);
    equate(reg5, reg9);
    stw(var0, reg5);
    ldw(reg10, var0);
    add(reg11, reg10, 8);
    stw(var0, reg11);
    ldw(reg10, var0);
    add(reg11, reg10, 8);
    stw(var0, reg11);
    ldw(reg13, ((unsigned) &(RW_mode)));
    ldw(reg14, reg13, ((int) (10) * (4)));
    ldw(reg15, var0);
    stw(reg14, reg15);
L2:
    end
```

DYNAMIC HOST CODE GENERATION FROM ARCHITECTURE DESCRIPTION FOR FAST SIMULATION

RELATED APPLICATION

This Application claims benefit of U.S. Provisional Patent Application Ser. No. 60/753,934, filed Dec. 22, 2005, which is hereby incorporated herein by reference in its entirety.

BACKGROUND OF THE INVENTION

Field of the Invention

Embodiments of the present invention relate to tools for the automated simulation of computer hardware.

Related Art

During the design of a microprocessor, or microcontroller, it is generally necessary to specify an instruction set that describes the instructions to be performed or executed by the processor. It is generally desirable to test such an instruction set prior to the actual manufacture of a hardware embodiment of the microprocessor. A software tool that enables such testing of instructions is generally known or referred to as an instruction set simulator.

Conventional instruction set simulators are generally undesirably slow. Generally, such a simulator executes a description of the instruction behavior, e.g., as specified by the processor designer, for every instruction. For example, two different instructions of the same type, e.g., "ADD R1, R2, R3" and "ADD R5, R6, R7," are generally simulated by executing exactly the same instruction description.

In a case in which a high level description of an instruction contains control structures, for example, "if/then/else" structures, the conventional art generator typically generates host simulation instruction for all possible outcomes of the control structure. If control structures are nested, as is common, this process can result in creation of very large numbers of code segments corresponding to all possible permutations of test conditions.

As an unfortunate result, conventional simulation can execute hundreds to thousands of times slower than a target set of instructions is designed to operate.

SUMMARY OF THE INVENTION

Accordingly, systems and methods of dynamic host code generation from architecture description in a high level programming language for fast simulation are needed. In addition, systems and methods of dynamic host code generation from architecture description for fast simulation would be advantageous. Further, systems and methods of dynamic host code generation from architecture description for fast simulation that are compatible and complimentary with conventional processor and instruction set design tools and methodologies are highly desired.

Systems and methods of dynamic host code generation from architecture description for fast simulation are disclosed. In accordance with a method embodiment of the present invention, a method of simulating execution of a first plurality of processor instructions written in a first instruction set comprises generating a second plurality of processor instructions in a second instruction set for emulating the first plurality of processor instructions.

In accordance with another embodiment of the present invention, a method of simulating execution of a first plurality of processor instructions written in a first instruction set comprises analyzing the first plurality of processor instructions to identify static elements of the first plurality of processor instructions. A second plurality of processor instructions in a second instruction set is generated to emulate the first plurality of processor instructions, wherein instructions of the second plurality corresponding to the static elements execute in a non-branching, or straight line manner. The second plurality of processor instructions is executed to simulate execution of the first plurality of instructions.

Major advantages of the present invention are afforded by generating host simulation code during the simulation of the target instructions. By utilizing knowledge of machine state during simulated execution, portions of target instruction descriptions may not need to be generated or executed. Elimination of such unnecessary segments of host simulation code results in advantageously reduced host code footprints and beneficially decreased simulation durations.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

FIG. 3 illustrates a run time code generator for an exemplary instruction, in accordance with embodiments of the present invention.

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow (e.g., processes 600, 700 and 800) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "performing" or "querying" or "sending" or "accessing" or "commanding" or "storing" or "dividing" or "computing" or "testing" or "calculating" or "determining" or "measuring" or "adjusting" or "comparing" or "synchronizing" or "retrieving" or "conveying" or "resuming" or "installing" or "gathering" or the like, refer to the action and processes of a computer system, or similar electronic computing device" that manipulates and transforms data represented as physical (electronic) quantities within the computer system's registers and memories into other data similarly represented as physical quantities within the computer system memories or registers or other such information storage, transmission or display devices.

Dynamic Host Code Generation from Architecture Description for Fast Simulation

Simulation generally comprises generating host simulation software to emulate a target instruction or sequence of instructions. Simulation is frequently desirable to test functionality of a processor design before the design is actually built. For example, prior to construction of a new processor design, its instruction set is defined, but no hardware, e.g., the new processor, exists to execute such a new instruction set. Such an instruction set may be software-only executable, for example, the instructions may only be executed by other software, in a different instruction set, operating on an existing processor.

In general, a target instruction, or portions of an instruction, can be broken down into two parts—a static part and a dynamic part. As used herein, the terms "static" and "dynamic" describe or refer to characteristics of a target instruction relative to the execution (or simulated execution) of that target instruction.

In the case of a dynamic instruction, or portion of an instruction, the instruction, or instruction portion, is only known at execution or simulation time. For example, a value in a register or memory location is generally only known during execution. For example, an instruction to add the values of two registers together, comprises dynamic components. The values of the two registers generally cannot be known until the instruction is ready to execute.

In contrast, static instructions, or portions of instructions, comprise characteristics that can be determined prior to execution. For example, an instruction of the form "load register A immediate constant" is highly static, in that the function (load), the target (register A) and the value are known ahead of time.

In general, conventional simulators execute generalized instruction descriptions. For example, two different instructions of the same type, e.g., "ADD R1, R2, R3" and "ADD R5, R6, R7," are generally simulated by executing exactly the same instruction description. However, in accordance with embodiments of the present invention, the behavior of, e.g., "ADD R1, R2, R3" can be simulated faster by software that is specialized for this instruction, for example, software that can simulate "ADD R1, R2, R3" but cannot simulate "ADD R5, R6, R7." Since the addressed registers (R1, R2 and R3) are fixed, more efficient and faster-executing code can be executed, in contrast to more generic code that has to determine which registers are in use.

It is to be appreciated that instructions frequently comprise both static and dynamic elements. For example, the exemplary add instruction described previously may comprise fixed addend and result register locations, e.g., the "add" instruction adds the contents of register A to the contents of register B and places the result in register C. Consequently, although the values in these registers may not be known prior to execution and are thus dynamic, the operation to be performed and the locations for these values are fixed, and are thus static.

Since the instructions are generally specified in a generic format, e.g., the previous "ADD" instruction is defined as capable of adding any two registers and placing the result in a third register, e.g., "ADD Rx, Ry, Rz," such specialized code to take advantage of specific elements, e.g., the exemplary specification of three specific registers, must be generated.

In accordance with embodiments of the present invention, a host code generator accessed as input a specific instance of an instruction, e.g., "ADD R1, R2, R3" and the general description of the instruction behavior, "ADD Rx, Ry, Rz adds registers Rx and Ry and places the result in Rz."

In accordance with embodiments of the present invention, a program written in a target set of instructions is analyzed to determine static and dynamic elements of the program.

As a result of this analysis, a set of host instructions is generated to emulate any fully static instructions. For example, if a condition of an if/then/else structure can be determined statically, then no testing is required during emulation, and only code for the chosen branch needs to be generated. In this novel manner, both simulation actions, e.g., simulation of the condition test, as well as generation of emulation instructions for the branch not taken are beneficially avoided, and the time required to perform such tasks is advantageously eliminated. It is to be appreciated that there are a wide variety of specific instruction instances that are static, including, e.g., the aforementioned load immediate instruction.

It is appreciated that some instructions may comprise static elements, even though the instruction as a whole may be considered dynamic. In consideration of the exemplary add instruction, presented above, a conventional simulation would comprise generating host code for determining which registers are to be added, looking up the values contained in those registers, determining which register gets the result, performing the addition and placing the result.

However, the register names may be static. For example, the register names may be static because of the definition of the instruction, e.g., the add instruction is designed to add registers A and B together and place the result in register C. Alternatively, the register names may be static because the registers are specified statically in a specific instance of an instruction, e.g., "C gets A+B." Embodiments in accordance with the present invention can generate host code, prior to emulation, that directly emulates the desired operation. It is appreciated that the conventional art process of determining which registers contain the values for the operation is advantageously eliminated, beneficially recovering the time conventionally spent to perform this operation, resulting in a desirably decreased simulation duration.

In general, embodiments in accordance with the present invention may seek out statically defined target instructions or portions of target instructions, and generate host emulation instructions based on those static elements. In this novel manner, large portions of host processing to determine how to generate emulation instructions can be eliminated from the actual emulation process.

Figure 1:
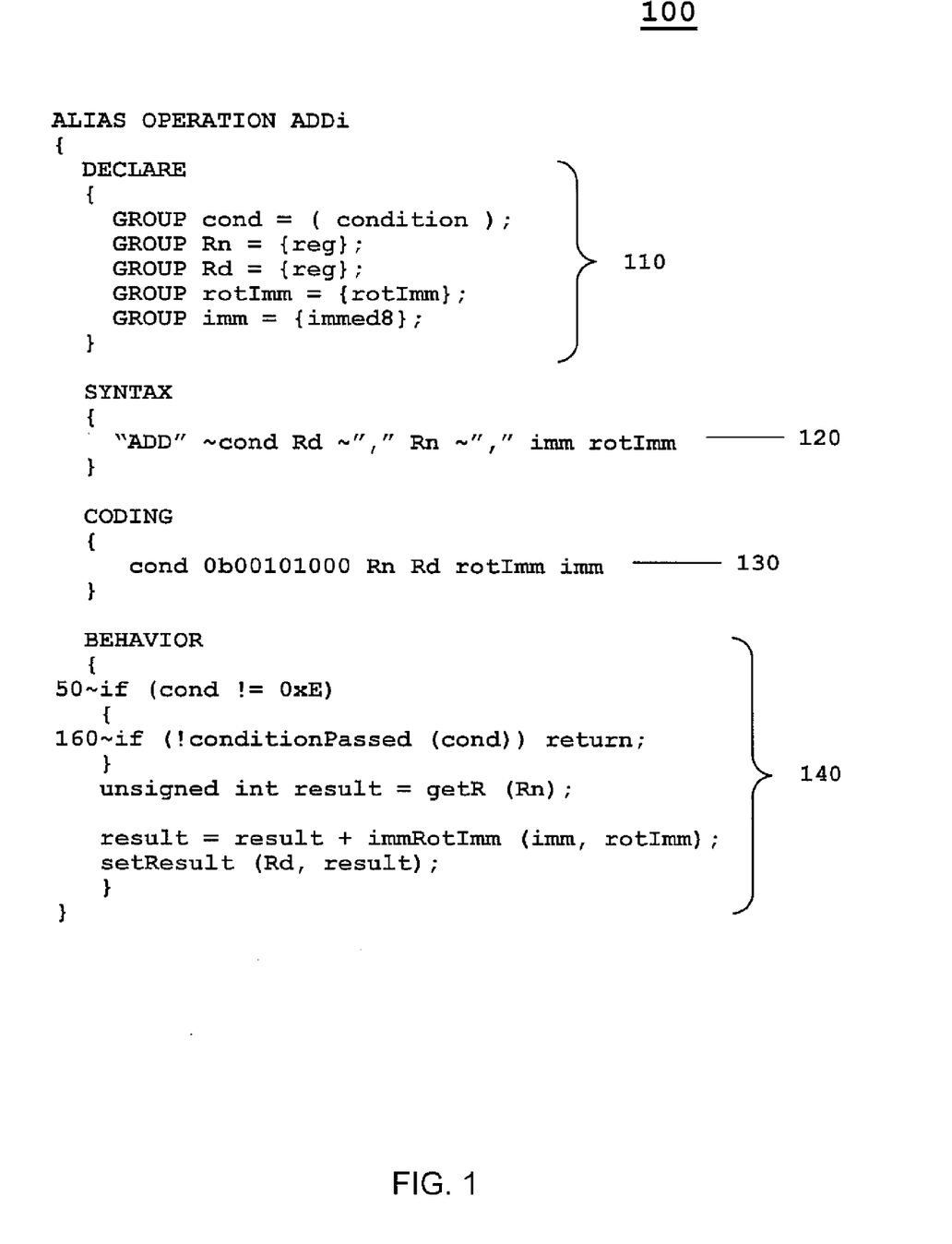
FIG. 1 illustrates a formal declaration of an exemplary instruction, in accordance with embodiments of the present invention.

FIG. 1 illustrates a formal declaration 100 of an exemplary instruction, in accordance with embodiments of the present invention. Declaration 100 is written in the "C" programming language. It is appreciated that embodiments in accordance with the present invention are well suited to declarations written in other high-level programming languages as well.

Declaration 100 describes an exemplary "ADDi," or "add immediate" instruction. Section 110 of declaration 100 declares the variables used in the declaration. For example, "cond" is a condition, "Rn" and "Rd" are registers, and "imm" is an eight-bit immediate value.

Section 120 of declaration 100 describes the syntax of the exemplary ADDi instruction. For example, section 120 describes the rules for the textual description of an ADDi instruction, e.g., as input to an assembler. Section 130 of declaration 100 describes the coding of the exemplary ADDi instruction. For example, section 130 describes the binary output resulting from assembly of the instruction.

Section 140 is a formal description of the behavior of the instruction. For example, the instruction is subject to conditional execution. The instruction evaluates the condition to determine if the instruction actually executes, or posts its results. If the instruction fully executes, it adds a potentially rotated immediate value to the value of register Rn and posts the result to register Rd.

Figure 2:
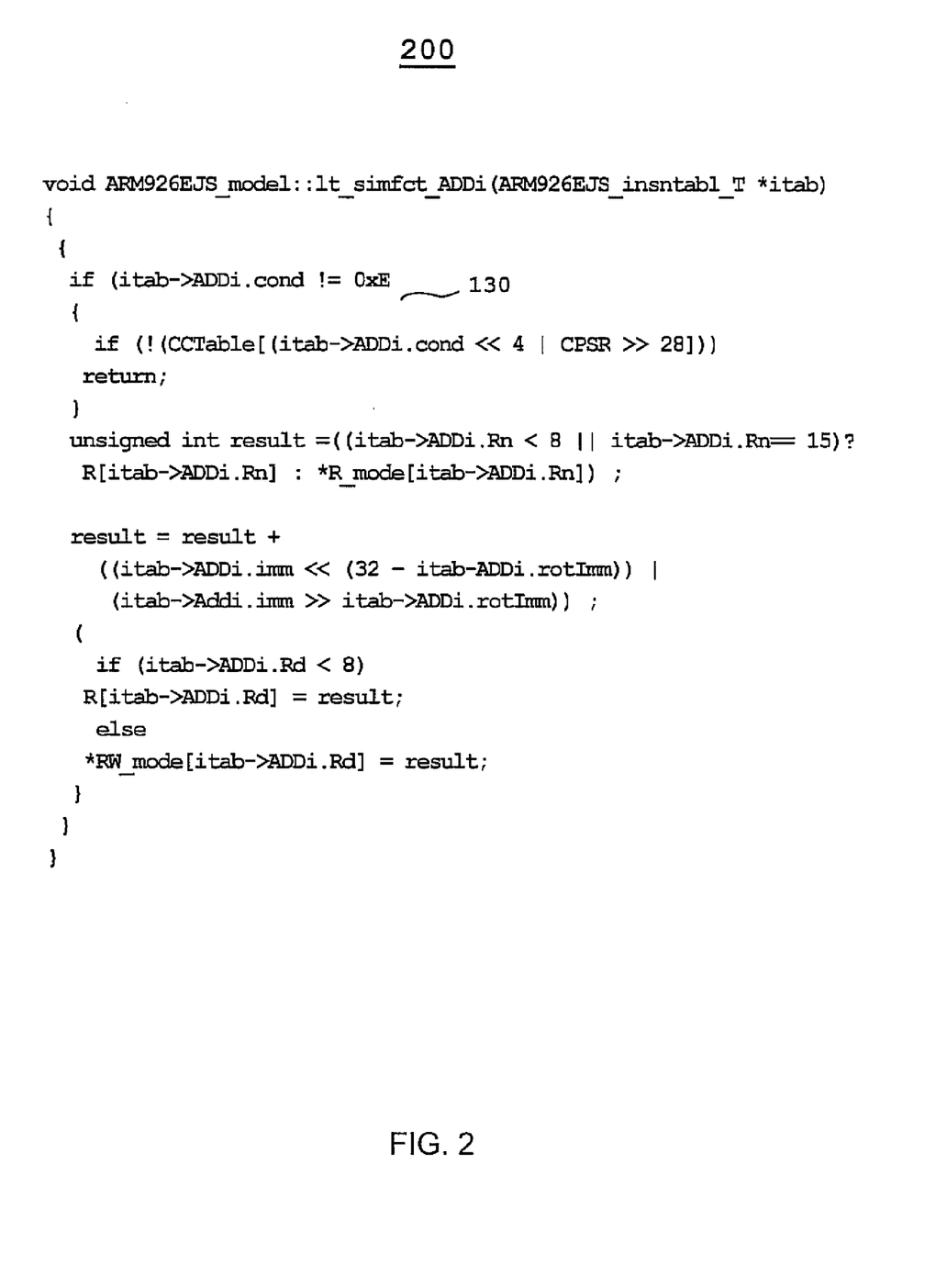
FIG. 2 illustrates a code segment as would be generated and executed by a conventional simulator, in accordance with embodiments of the present invention.

FIG. 2 illustrates a code segment 200 as would be generated and executed by a conventional simulator to emulate the exemplary ADDi instruction described in FIG. 1, in accordance with embodiments of the present invention. It is to be appreciated that code segment 200 is strictly identical for every instance of an ADDi instruction. There is no dependence on any values, e.g., "cond" or "Rn."

FIG. 3 illustrates a run time code generator 300 for the exemplary ADDi instruction, in accordance with embodiments of the present invention. It is to be appreciated that run time code generator 300 will typically produce different emulation or host code corresponding to different instances of an ADDi instruction. Such differences are based on the actual values of the operands as evaluated at simulation time.

Figure 4A:
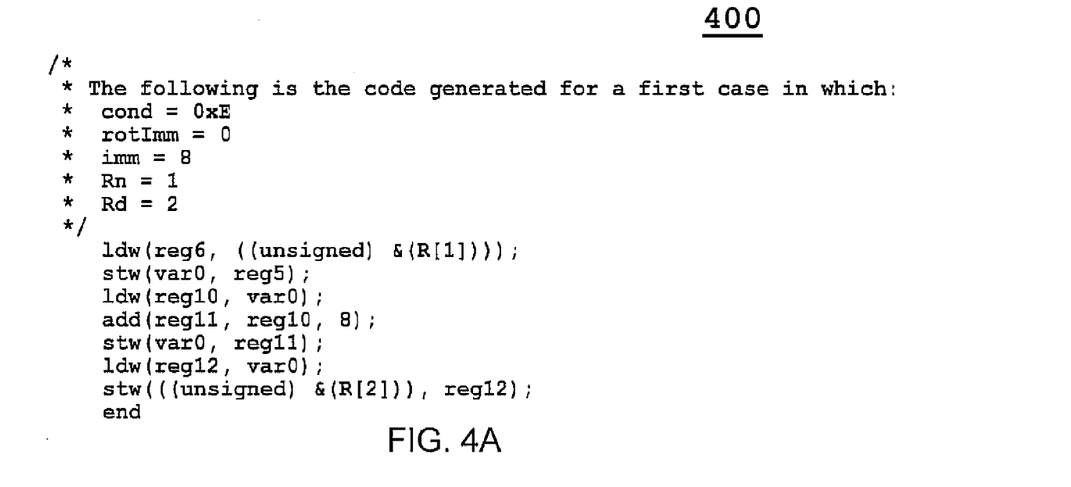
FIG. 4A illustrates exemplary host simulation code generated by run time code generator for a first set of state values, in accordance with embodiments of the present invention.
Figure 4B:
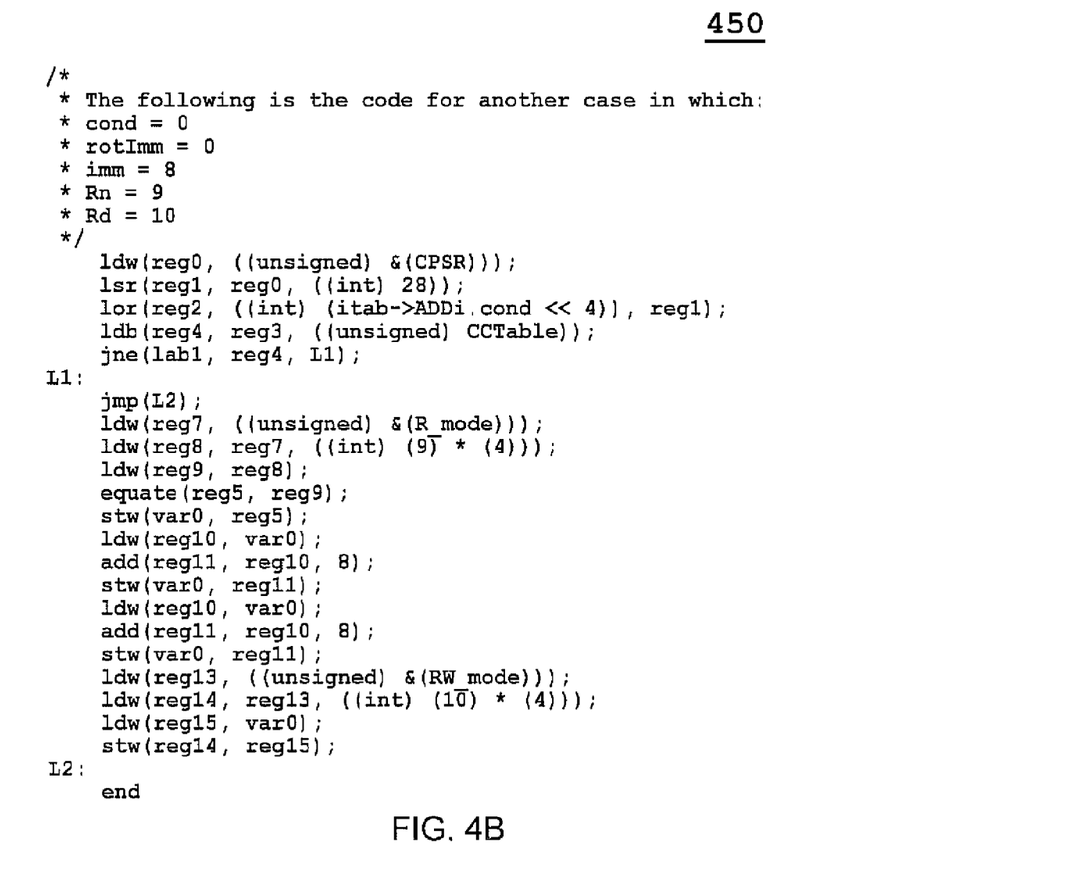
FIG. 4B illustrates exemplary host simulation code generated by run time code generator for a second set of state values, in accordance with embodiments of the present invention.

FIG. 4A illustrates exemplary host simulation code 400 generated by run time code generator 300 for a first set of state values, in accordance with embodiments of the present invention. FIG. 4B illustrates exemplary host simulation code 400 generated by run time code generator 300 for a second set of state values, in accordance with embodiments of the present invention. It is appreciated that host simulation code 400 is distinct from host simulation code 450.

With reference to FIGS. 1, 2, 3, 4A and 4B, it is to be appreciated that the behavior description 140 of the exemplary ADDi instruction comprises two "if" statements, if statement 150 and if statement 160 (FIG. 1). The condition variable "cond" refers to a portion of the binary instruction word that is known when the simulation host code is generated. Consequently, the value of "cond" is static within the execution environment, and does not change within simulation of the instruction. Rather, the value of "cond," in conjunction with if statement 150, serves to "steer" execution flow to a particular branch of code.

Under the conventional art, host code for if statement 150 is generated and executed at statement 210 of FIG. 2. In contrast, there is no code within host code generator 300 corresponding to if statement 150. Further, no code is generated for if statement 150, and no code corresponding to if statement 150 is present within host simulation code 400 (FIG. 4A) or within host simulation code 450 (FIG. 4B), in accordance with embodiments of the present invention. Consequently, the host simulation code for this static portion of an instruction executes in a "straight line," or a non-branching, non-conditional manner.

In this novel manner, through evaluation of static characteristics of target instructions, unnecessary code is neither generated nor executed, beneficially increasing that rate of simulating such instructions.

It is to be further appreciated that if statement 160 (FIG. 1) is not static, as it reads a value from memory that can be altered in the course of simulation. Thus, if statement 160 generates a conditional jump 310 (FIG. 3) in the run time code generator 300.

Figure 5:
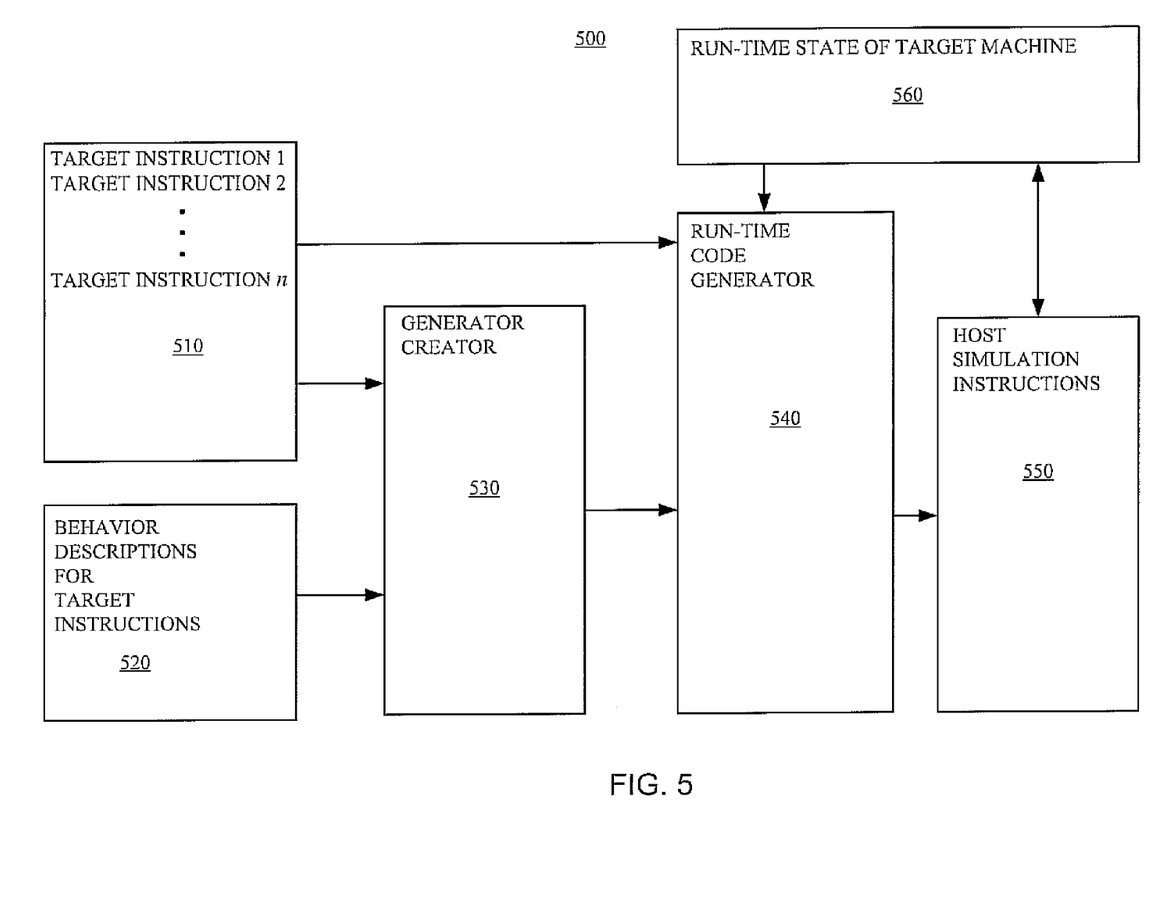
FIG. 5 is a data flow diagram illustrating an exemplary embodiment in accordance with the present invention.

FIG. 5 is a data flow diagram 500 illustrating an exemplary embodiment in accordance with the present invention. A first plurality of target instructions 510 is written in a target instruction set, for example, an instruction set characteristic of a computer processor, e.g., a microprocessor or microcontroller. Such a characteristic instruction set is generally know as or referred to as the assembly language of the processor. It is to be appreciated, however, that embodiments in accordance with the present invention are not limited to assembly level programming.

Behavior descriptions for the target instructions 520 are provided, e.g., from a processor designer. Generally, behavior descriptions 520 describe the functionality of a target instruction. Behavior descriptions 520 are more fully described in conjunction with FIG. 1, above.

Generator creator 530 accesses target instructions 510 and behavior descriptions 520 to create run-time code generator 540. An exemplary run-time code generator is illustrated by run-time code generator 300 of FIG. 3. In contrast to prior art code generators, run-time code generator 540 generates host simulation instructions during the actual simulation of target instructions 510. Generally, run-time code generator 540 will query run-time state of target machine 560 and utilize state information in an on-going process to generate host simulation instructions 550.

As host simulation instructions 550 execute on a host processor to emulate target instructions 510, host simulation instructions 550 interact, e.g., query and update values, with run-time state of target machine 560, which may feed back to run-time code generator 540.

It is to be appreciated that host simulation instructions 550 generally comprise fewer instructions than a corresponding structure under the convention art, as many branches typically present in such simulation code are unnecessary due to the run-time nature of run-time code generator 540. For example, utilizing information from the simulated target instructions, run-time code generator 540 is able to determine that a portion of code paths, or branches, normally required to completely describe an instruction will not be needed for a particular instance of that instruction.

In this novel manner, the amount of host simulation code is reduced in comparison to the conventional art, and the resulting execution of such host simulation code is advantageously much faster.

Figure 6:
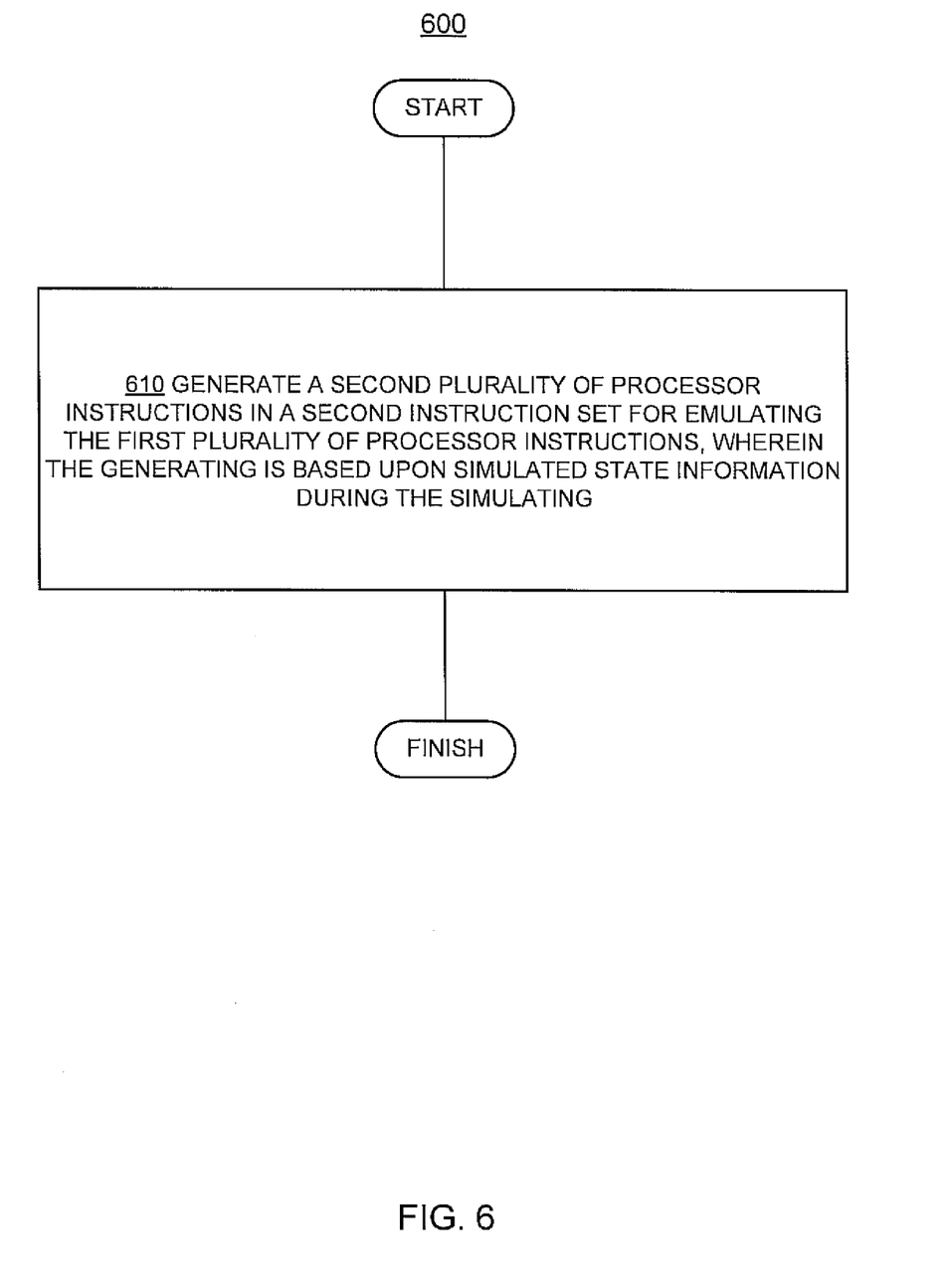
FIG. 6 is a flow chart of a method for simulating execution of a first plurality of processor instruction written in a first instruction set, in accordance with embodiments of the present invention.

FIG. 6 is a flow chart of a method 600 for simulating execution of a first plurality of processor instruction written in a first instruction set, in accordance with embodiments of the present invention.

In 610, a second plurality of processor instructions in a second instruction set is generated for emulating the first plurality of processor instructions, wherein the generating is based upon simulated state information during the simulating. It is appreciated that embodiments in accordance with the present invention are well suited to simulation of a single, target instruction, as well as to simulation of larger programs comprising multiple target instructions.

In accordance with embodiments of the present invention, the second plurality of processor instructions may be reduced by use of the state information. As described previously, including with respect to FIG. 5, utilization of state information can result in not generating code in the second plurality of processor instructions that corresponds to instruction behavior that is not actually executed in a specific instance of a target instruction, or a specific sequence of target instructions.

In accordance with another embodiment of the present invention, generating the second plurality of instructions may comprise determining a static characteristic of a target instruction. In accordance with still other embodiments of the present invention, the second plurality of processor instructions execute without branching, or "in line."

In accordance with embodiments of the present invention, the generation of the second plurality of processor instructions may comprise accessing a behavior description of the first plurality of instructions. The behavior description should be written in a high level language, for example, the C programming language.

Figure 7:
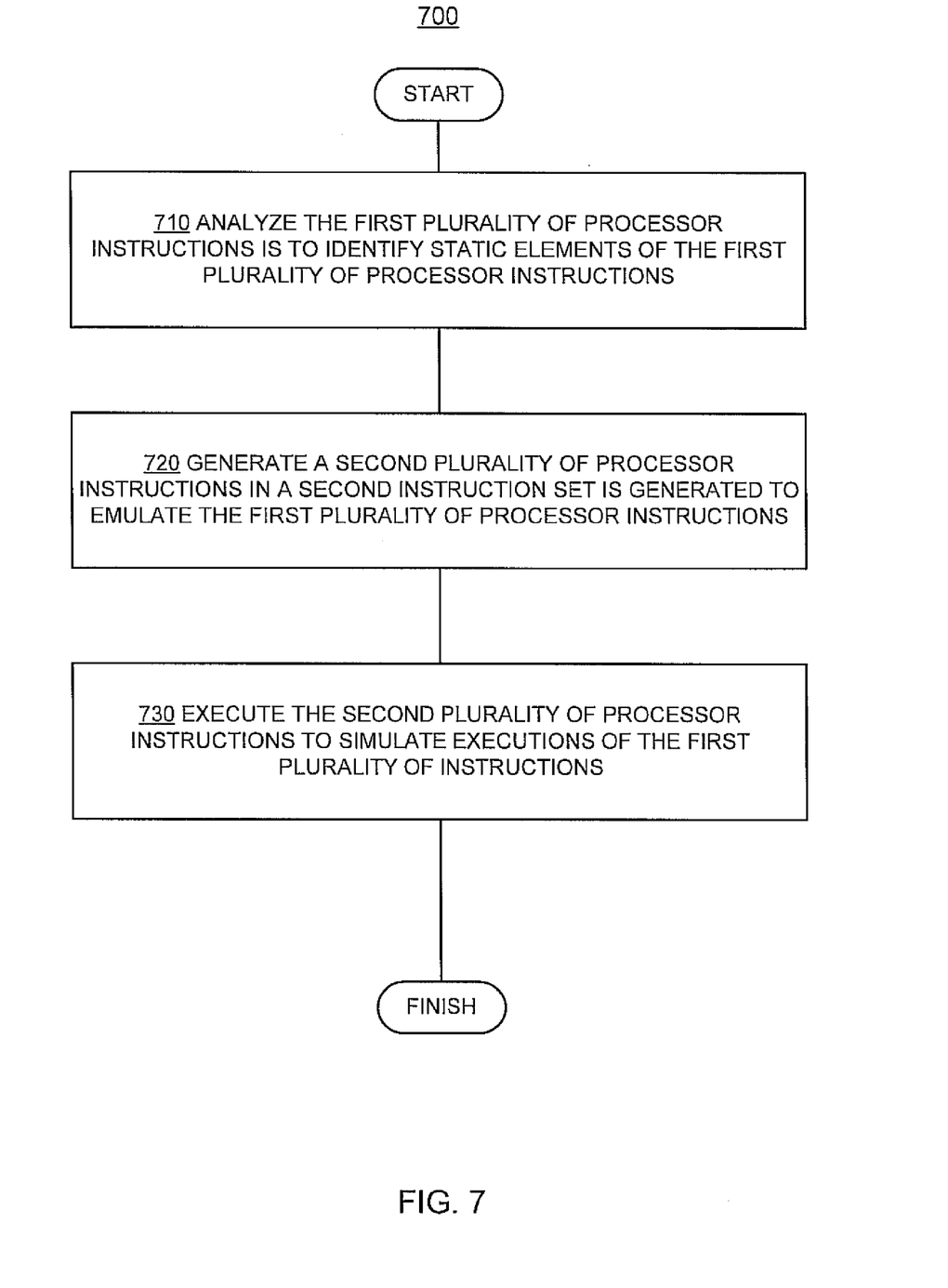
FIG. 7 is a flow chart of a method for simulating execution of a first plurality of processor instruction written in a first instruction set, in accordance with embodiments of the present invention.

FIG. 7 is a flow chart of a method 700 for simulating execution of a first plurality of processor instruction written in a first instruction set, in accordance with embodiments of the present invention. In 710, the first plurality of processor instructions is analyzed to identify static elements of the first plurality of processor instructions.

In 720, a second plurality of processor instructions in a second instruction set is generated to emulate the first plurality of processor instructions, wherein instructions of the second plurality corresponding to the static elements execute in a non-branching manner. In 730, the second plurality of processor instructions is executed to simulate execution of the first plurality of instructions.

In accordance with embodiments of the present invention, portions of 710 may be performed during the simulating. In accordance with other embodiments of the present invention, portions of 710 may be performed based on a simulated state of a processor executing the first plurality of instructions.

In accordance with another embodiments of the present invention, portions of 720 may be performed during the simulating. In accordance with still other embodiments of the present invention, portions of 720 may be performed based on a simulated state of a processor executing the first plurality of instructions. The simulated state may represent a state of a processor, or machine implementation model, immediately prior to simulated execution of the first plurality of instructions.

In accordance with embodiments of the present invention, method 700 may be performed when no hardware exists to natively execute the first plurality of instructions. For example, the first instruction set represents a processor design that has not been physically instantiated.

Figure 8:
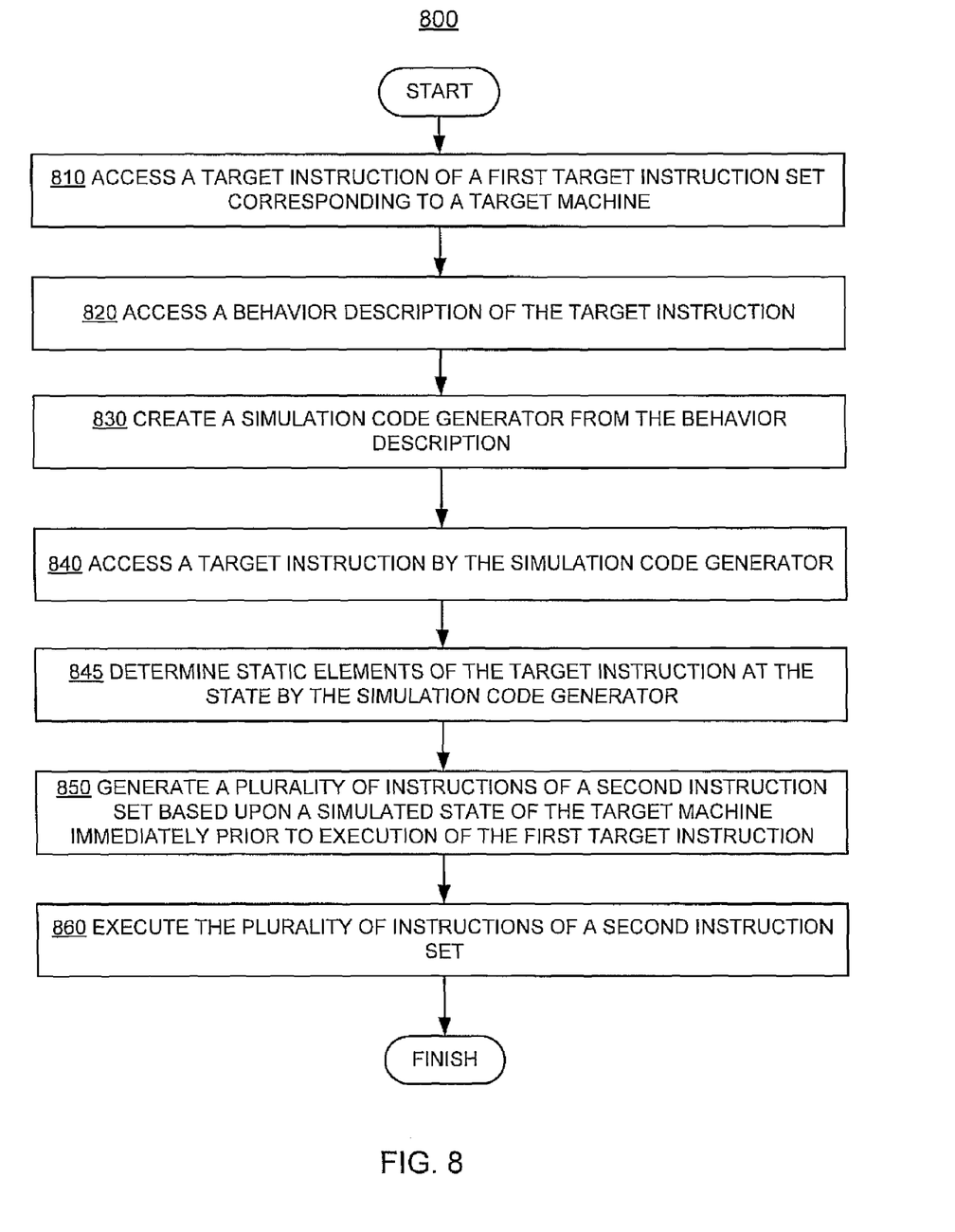
FIG. 8 is a flow chart of a method, in accordance with embodiments of the present invention.

FIG. 8 is a flow chart of a method 800, in accordance with embodiments of the present invention. In 810, a target instruction of a first target instruction set corresponding to a target machine is accessed. In 820, a behavior description of the target instruction is accessed.

In 830, a simulation code generator from the behavior description is created. In 840, the simulation code generator accesses the target instruction. In optional 845, the simulation code generator determines static elements of the target instruction at the state.

In 850, a plurality of instructions of a second instruction set is generated based upon a simulated state of the target machine immediately prior to execution of the first target instruction. In 860, the plurality of instructions of a second instruction set is executed.

In accordance with embodiments of the present invention, the plurality of instructions may execute in a straight-line manner. In accordance with other embodiments of the present invention, the behavior description may be written in a version of the C programming language.

In accordance with embodiments of the present invention, a host code generator attempts to identify blocks of target code that are executed often enough such that it is beneficial to expend time during simulation to generate specialized host code for each instruction in the block. For example, a threshold for a number of passes though such a block may be established. In an alternative embodiment, software may estimate the time required to generate such specialized host code and compare such time with time required to simulate such a block without utilizing specialize code.

As a beneficial result, time spent creating specialized code to simulate the block is beneficially recovered by the faster simulation of the block by the specialized code.

In summary, embodiments of the present invention provide systems and methods of dynamic host code generation from architecture description in a high level programming language for fast simulation. In addition, systems and methods of dynamic host code generation from architecture description for fast simulation are provided. Further, systems and methods of dynamic host code generation from architecture description for fast simulation that are compatible and complimentary with conventional processor and instruction set design tools and methodologies are realized.

Embodiments in accordance with the present invention are thus described. While the present invention has been described in particular embodiments, it should be appreciated that the present invention should not be construed as limited by such embodiments, but rather construed according to the below claims.

What is claimed is:

1. A method comprising:
accessing a target instruction of a target instruction set;
accessing a formal description of a behavior of the target instruction, the formal description including a branching condition;
generating host instructions in a host instruction set different from the target instruction set to simulate the target instruction, the host instructions generated based on a value of the branching condition of the formal description, and the host instructions are free of instructions corresponding to a non-executed branch of the formal description of the target instruction; and executing the generated host instructions on a host processor to simulate execution of the target instruction.

2. The method of claim 1 further comprising simulating a state of a target processor intended to execute the target instruction set.

3. The method of claim 1 further comprising analyzing the target instruction for characteristics that can be determined prior to execution, wherein the host instructions are generated based on results of the analysis.

4. The method of claim 1 wherein the host instructions execute without branching.

5. The method of claim 1 wherein the formal description is written in a high level language.

6. The method of claim 1, wherein the branching condition selects a branch of a plurality of branches of the formal description of the behavior of the target instruction; and wherein the host instructions are further generated based on the branch of the plurality of branches of the formal description of the behavior of the target instruction selected by the branching condition.

7. The method of claim 1, wherein the host instructions are generated based on only the branch of the plurality of branches of the formal description of the behavior of the target instruction selected by the branching condition.

8. The method of claim 1, wherein the branching condition is an if statement of the formal description of the behavior of the target instruction and the host instructions are free of instructions corresponding to the branching condition that is the if statement of the formal description of the behavior of the target instruction.

9. A method of simulating execution of a first plurality of instructions of a target instruction set, the method comprising:
analyzing the first plurality of instructions to identify characteristics of the first plurality of instructions that can be determined prior to execution, the characteristics corresponding to branching conditions in formal descriptions of a behavior of the first plurality of instructions;
generating a second plurality of instructions in a host instruction set to emulate the first plurality of instructions based on the characteristics corresponding to the branching conditions in the formal descriptions, wherein instructions of the second plurality of instructions are free of instructions corresponding to non-executed branches of the formal descriptions of the first plurality of instructions, and
executing the generated second plurality of instructions on a host processor to simulate execution of the first plurality of instructions.

10. The method of claim 9 further comprising:
analyzing a third plurality of instructions of the target instruction set to identify characteristics of the third plurality of instructions that can be determined prior to execution;
generating a fourth plurality of instructions in the host instruction set to emulate the third plurality of instructions, wherein instructions of the fourth plurality of instructions execute in a non-branching manner, and
executing the fourth plurality of instructions to simulate execution of the third plurality of instructions, wherein the analysis of the third plurality of instructions is performed subsequent to the execution of the second plurality of instructions, and prior to the execution of the fourth plurality of instructions.

11. The method of claim 10 wherein the analysis of the third plurality of instructions is based on a simulated state of a processor executing the first plurality of instructions.

12. The method of claim 9 wherein the generation of the second plurality of instructions is performed during a simulation of the first plurality of instructions.

13. The method of claim 12 wherein the generation of the second plurality of instructions is based on a simulated state of a processor executing the first plurality of instructions.

14. The method of claim 13 wherein the simulated state is determined immediately prior to simulating execution of the first plurality of instructions.

15. The method of claim 9 wherein analyzing the first plurality of instructions comprises accessing the formal descriptions of the behavior of the first plurality of instructions written in a high level language.

16. A non-transitory computer-readable medium storing instructions, the instructions when executed by a host processor cause the host processor to:
access a target instruction of a target instruction set;
access a formal description of behavior of the target instruction, the formal description including a branching condition;
generating host instructions in a host instruction set of the host processor different from the target instruction set to simulate the target instruction, the host instructions generated based on a value of the branching condition of the formal description, and the host instructions are free of instructions corresponding to a non-executed branch of the formal description of the target instruction; and execute the generated host instructions on the host processor to simulate execution of the target instruction.

17. The non-transitory computer-readable medium of claim 16 wherein the instructions further cause the processor to analyze the target instruction for characteristics that can be determined prior to execution, wherein the host instructions are generated based on results of the analysis.

18. The non-transitory computer-readable medium of claim 16 wherein the host instructions are free of instructions corresponding to a non-executed branch of the formal description of the target instruction.

19. The non-transitory computer-readable medium of claim 16 wherein the host instructions execute without branching.

20. A non-transitory computer-readable medium storing instructions, the instructions when executed by a host processor cause the host processor to:

analyze a first plurality of instructions to identify characteristics of the first plurality of instructions that can be determined prior to execution, the characteristics corresponding to branching conditions in formal descriptions of the first plurality of instructions;

generate a second plurality of instructions in a host instruction set to emulate the first plurality of instructions based on the characteristics corresponding to the branching conditions in the formal descriptions, wherein instructions of the second plurality of instructions are free of instructions corresponding to non-executed branches of the formal descriptions of the first plurality of instructions, and execute the generated second plurality of instructions on a host processor to simulate execution of the first plurality of instructions.

\* \* \* \* \*